United States Patent
Chen

(10) Patent No.: US 6,996,345 B1
(45) Date of Patent: Feb. 7, 2006

(54) LINEARIZATION OF INTENSITY MODULATORS USING QUADRATIC ELECTRO-OPTIC EFFECT

(75) Inventor: Jerry C. Chen, Arlington, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 734 days.

(21) Appl. No.: 10/145,616

(22) Filed: May 10, 2002

(51) Int. Cl.
H04B 10/04 (2006.01)

(52) U.S. Cl. ........................ 398/183; 398/186
(58) Field of Classification Search ............... 398/183, 398/186; 385/2, 5, 8
See application file for complete search history.

(56) References Cited

U.S. PATENT DOCUMENTS

| | | | | |
|---|---|---|---|---|
| 5,479,539 A | * | 12/1995 | Goldsmith et al. | 385/14 |
| 5,850,305 A | * | 12/1998 | Pidgeon | 398/193 |
| 5,963,567 A | * | 10/1999 | Veselka et al. | 372/21 |
| 6,341,184 B1 | * | 1/2002 | Ho et al. | 385/3 |
| 6,647,158 B2 | * | 11/2003 | Betts et al. | 385/2 |

* cited by examiner

Primary Examiner—M. R. Sedighian
Assistant Examiner—Dalzid Singh
(74) Attorney, Agent, or Firm—William G. Auton

(57) ABSTRACT

Changing the phrases when mixing of optical modes gives rise to intensity effects. This occurs in multi-mode interferometer (MMI) or arrayed waveguide gratings (AWG). Here we use an electro-arefractive modulator, with a quadratic electro-optic effect that has an optical transfer function (Or power vs voltage (L-V) curve) given by is $P_{out}=P_{in}(1+\gamma \cos \theta)/2$ where asymmetry factor $\gamma$ measures the extinction ratio and the phase difference $\theta$ between arms is $$\pi \frac{V^2}{V_\pi^2} \pi \frac{V^2}{V_\pi^2}.$$

In turn, the voltage V is expressed as a sum of the DC bias and RF drive $V=V_{DC}+V_{RF}$.

3 Claims, 3 Drawing Sheets

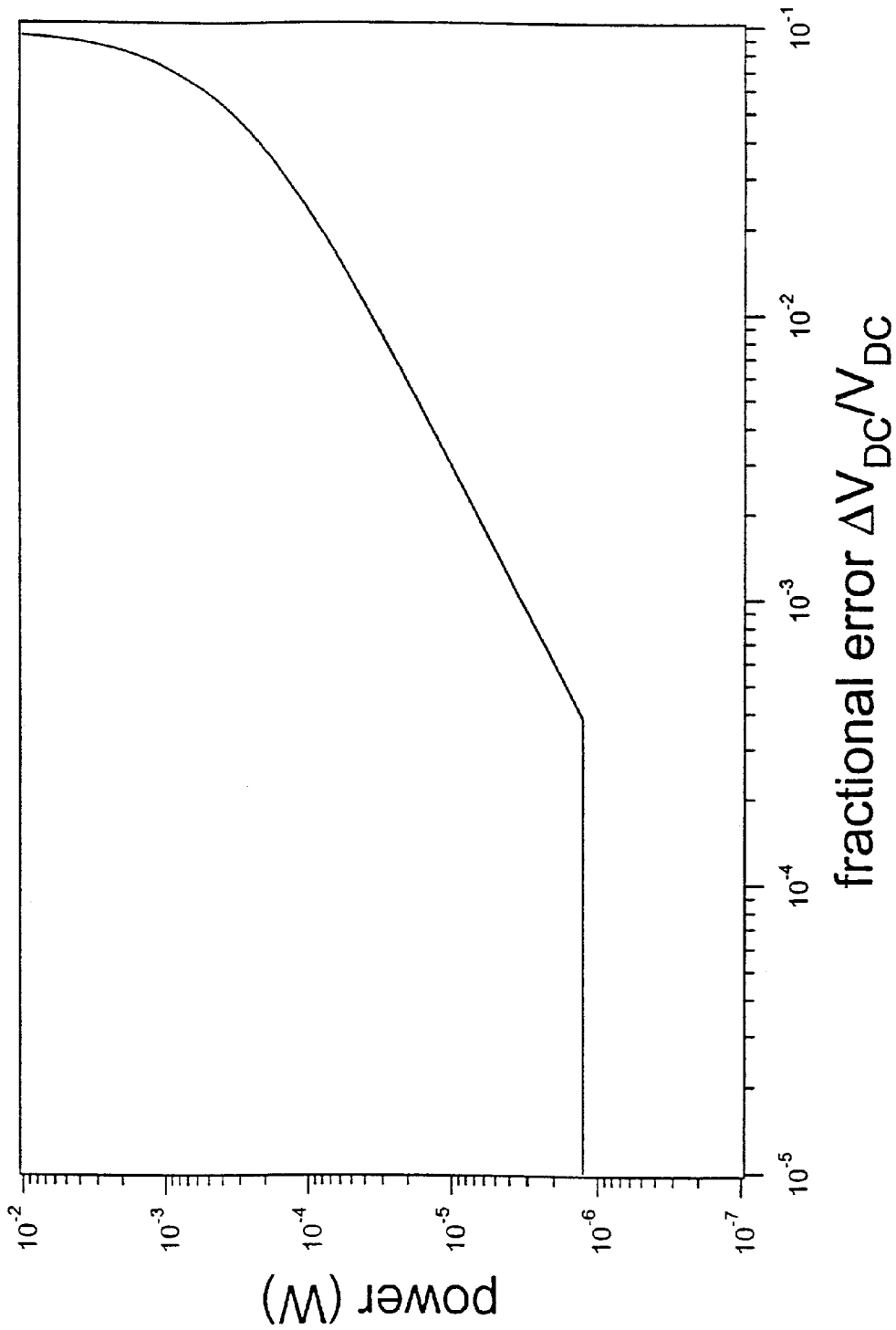

LINEARIZATION OF INTENSITY MODULATORS USING QUADRATIC ELECTRO-OPTIC EFFECT

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical modulators and more specifically to an intensity modulator where phase dependant addition of signals results in amplitude changes.

To minimize distortion, amplitude (or intensity) modulated links require linear components such as optical modulators. Such analog links are useful in commercial applications for distributing cable TV signals and in military settings for remoting antennas/radar/etc.

Examples of current optical modulator technology are described in the following references, the disclosures of which are incorporated herein by reference:

U.S. Pat. No. 5,889,906 entitled Signal router with coupling of multiple waveguide modes for provicing a shaped multi-channel radiation pattern issued to Jerry Chen;

M. Nazarathy, J. Berger, A. J. Ley, I. M. Levi and Y. Kagan, *J. Lightwave Technol.* 11 Jan. 1993, pp. 82–105.

L. M. Johnson and H. V. Roussell, *Opt. Lett.* 13, October 1988, pp. 928–30.

H. Skeie and R. V. Johnson, *Proc. SPIE: Integrated Optical Circuits* 1583, Boston, Mass.: 3–4 Sep. 1991, pp. 153–64.

J. E. Zucker, M. Wegener, K. L. Jones, T. Y. Chang, N. Sauer, and D. S. Chemia, *Appl. Phys. Lett.* 56, 14 May 1990, pp. 151–3.

A. I. Plakhotnik, *Opt. Spectrosc. (USSR)* 68, March 1990, pp. 394–7.

U.S. Pat. No. 5,625,729, Apr. 29, 1997, Optoelectronic device for coupling between an external optical wave and a local optical wave for optical modulators and detectors, Brown, Thomas G., U.S. Pat. No. 5,355,422, Oct. 11, 1994, Broadband optical modulator, Sullivan, Charles T., Bown and Sullivan describe electro refractive optical modulators useable in the present invention.

The above-cited references describe various modulators that use index changes to effect amplitude changes. A common example is the Mach Zehnder interferometer. Alternatively, one can use directional couples or Fabry Perot interferometers. Generally, the index changes depend linearly on the applied voltage. And all these modulators are inherently nonlinear giving rise to unwanted frequency harmonics. Researchers have sought to linearize them by predistorting the electrical input, and combining two or more in parallel and series. They have eliminated the $2^{nd}$ and/or $3^{rd}$ harmonic distortion products. Recently, interferometers with quadratic electro optic coefficients have been demonstrated in semiconductors with the quantum confined stark effect. To our knowledge, these electro refractive (a specific subset of quadratic electro-optic effect) devices have not been linearized yet, although Platonik suggested the suppression of second order harmonics in ceramics and lead magnoniobates, which also have quadratic electro optic effect. Here, we suggest, for the first time, a bias that suppresses third order harmonic distortion term. For sub octave signals, all the even harmonics can be filtered so the dominant nonlinearity is now the fifth harmonic.

SUMMARY OF THE INVENTION

The present invention is an optical modulation system that uses quadratic electro optic interferometry to AM modulate an optical signal using: an electrical RF signal generator, a laser, an electro refractive modulator, two optical amplifiers, a fiber optic medium and a demodulator.

The electro refractive modulator modulates the optical carrier wave from the laser with the electrical modulating signal from the RF signal generator. A suitable, programmable electro refractive modulator is found in the following two patents:

U.S. Pat. No. 5,625,729, Apr. 29, 1997, Optoelectronic device for coupling between an external optical wave and a local optical wave for optical modulators and detectors, Brown, Thomas G., U.S. Pat. No. 5,355,422, Oct. 11, 1994, Broadband optical modulator, Sullivan, Charles.

Quadratic electro optic modulation is integrated using the mathematical principles discussed below to program and control the electro refractive modulator. The optical amplifiers amplify the modulated signal from the modulator and the demodulator extracts the information from the modulated signal to recreate the information in the RF modulating signal.

BRIEF DESCRIPTION OF THE DRAWINGS

FIG. 3 is a chart of output power versus signal fractional error.

DESCRIPTION OF THE PREFERRED EMBODIMENT

Figure 1:
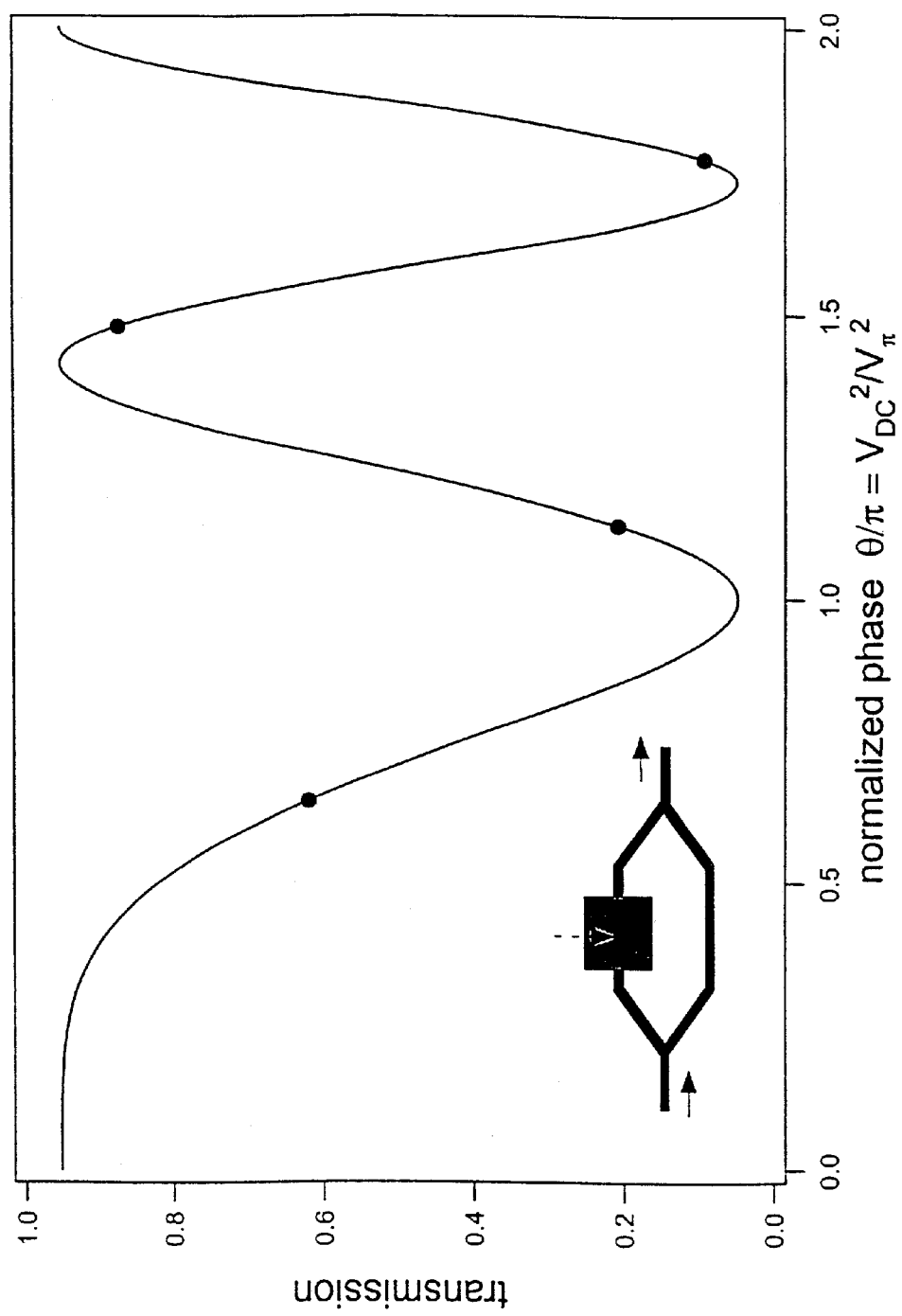
FIG. 1 is a chart of transmission amplitude against the normalized phase.

The present invention includes an optical modulator system that uses quadratic electro optic interferometry to adjust optical intensity, as described below.

Changing the phrases when mixing of optical modes can give rise to intensity effects. This can occur in MZI, multi-mode interferometer (MMI) or arrayed waveguide gratings (AWG). Here we consider the most popular embodiment, the MZI. The MZI with quadratic electro-optic effect would have an optical transfer function (Or power vs voltage (L-V) curve) given by is $P_{out}=P_{in}(1+\gamma \cos \theta)/2$ (FIG. 1) where asymmetry factor $\gamma$ measures the extinction ratio and the phase difference $\theta$ between arms is $$\pi \frac{V^2}{V_\pi^2} \pi \frac{V^2}{V_\pi^2}.$$

In turn, the voltage V can be expressed as a sum of the DC bias and RF drive $V=V_{DC}+V_{RF}$. Adopting the Taylor approximation of Halemane and Korotky[6], we expand the optical power as $$P_{out}/P_{in}=c_0+c_1 V_{RF}+c_2 V_{RF}^2+c_3 V_{RF}^3+ \ldots$$

where the Taylor expansion coefficients are $$c_k = \frac{1}{k!} \frac{d^k P_{out}}{dV^k}\bigg|_{V_{DC}} / P_{in}.$$

In an ideal analog link the first two (DC and linear) terms should dominate. The higher order terms distort the original RF signal by introducing frequency harmonics. a common test for nonlinearity introduces two closely spaced tones $V_{RF}(t) = V_M (\sin \omega_1 t + \sin \omega_2 t)$. If the signal bandwidth is sub octave, we can ignore all the even ordered Taylor products, because filters can block frequencies far from the RF signal. Unfortunately, odd products produce third order intermodulation distortion (IMD3) at $2\omega_1 - \omega_2$, $2\omega_2 - \omega_1$ and fifth order intermodulation (IMD5) at $3\omega_1 - 2\omega_2$, $3\omega_2 - 2\omega_1$ and so on. These frequencies cannot be filtered out easily. So, in unlinearized modulators, the third order terms would dominate. From substituting the above two tone $V_{RF}$, we find the IMD3 noise $$P_{out}^{(3)} / P_{in} = \frac{3}{4} c_3 V_M^3 + \frac{25}{8} c_5 V_M^5 + \ldots$$

From $V_{RF} = V_M \sin \omega_1 t$, we obtain the fundamental or signal term $$P_{out}^{(1)} / P_{in} = c_1 V_M + \frac{3}{4} c_3 V_M^3 + \ldots$$

The dynamic range, which is a popular measure of linearity, is the signal term divided by the IMD3 term.

For the electro-refractive interferometer, the Taylor coefficients are $$c_0 = \left(1 + \gamma \cos\pi \frac{V_{DC}^2}{V_\pi^2}\right) / 2$$

$$c_1 = -\gamma \pi \frac{V_{DC}}{V_\pi^2}$$

$$c_3 = \gamma \pi \left(-\frac{V_{DC}}{V_\pi^4} \cos\pi \frac{V_{DC}^3}{V_\pi^6} \sin\pi \frac{V_{DC}^2}{V_\pi^2}\right)$$

$$c_5 = \gamma \pi \left(\frac{1}{2} \frac{V_{DC}}{V_\pi^6} \sin\pi \frac{V_{DC}^2}{V_\pi^2} + \frac{2}{3} \frac{V_{DC}^3}{V_\pi^8} \cos\pi \frac{V_{DC}^2}{V_\pi^2} - \frac{2}{15} \frac{V_{DC}^5}{V_\pi^{10}} \sin\pi \frac{V_{DC}^2}{V_\pi^2}\right)$$

In these expressions, we neglect the losses from electro-absorption and the index changes from Franz-Keldysh. Those effects will not eliminate the IMD3 null. We can null our the $V_M^3$ term of IMD3 by setting $c_3$ to zero of cot $$\pi \frac{V_{DC}^2}{V_\pi^2} = \frac{2}{3} \frac{V_{DC}^2}{V_\pi^2}.$$

As circled in FIG. 1, this occurs at $|V_{DC}|/V_\pi = 0.6436, 1.1295, 1.4802, 1.7725$, etc. The IMD3 ter can be reduced further if we set $$\frac{3}{4} c_3 V_M^3 + \frac{25}{8} C_5 V_M^5 = 0.$$

The DC bias point depends slightly on the maximum RF drive.

To suppress the third order intermod, one needs set only one parameter, the DC voltage. If this cannot be controlled accurately, there may be some residual IMD3. At a dynamic range of 90 dB Hz$^{2/3}$ and a fractional bias error of $10^{-4}$, the maximum RF drive $V_M/V_\pi$ is limited to 0.0978 at $V_{DC}/V_\pi = 0.6436$, to 0.0842 at $V_{DC}/V_\pi = 1.1295$, to 0.0710 at $V_{DC}/V_\pi = 1.4802$, and to 0.0614 at $V_{DC}/V_\pi = 1.7725$. The optical modulation depth or modulation index is given my $m = c_1/c_0 \cdot V_{DC}/V_\pi$. At the nulls the modulation depth is $m = 28.78\%$, $86.32\%$, $22.90\%$, and $68.68\%$ at $V_{DC}/V_\pi = 0.6436, 1.1295, 1.4802$, and $1.7725$ respectively. At the nulls, the voltage deviations $V_M$ are fairly uniform. Most of the variation in modulation index stems from low biasing the modulator. There the device's insertion loss is high and the average power $P_{out} c_0$ is low giving a larger m. The modulation depth can be as high as 86.32%. In comparison, the modulation depth at quadrature (half power point) is an order of magnitude smaller $m = 4.52\%$.

Figure 2:
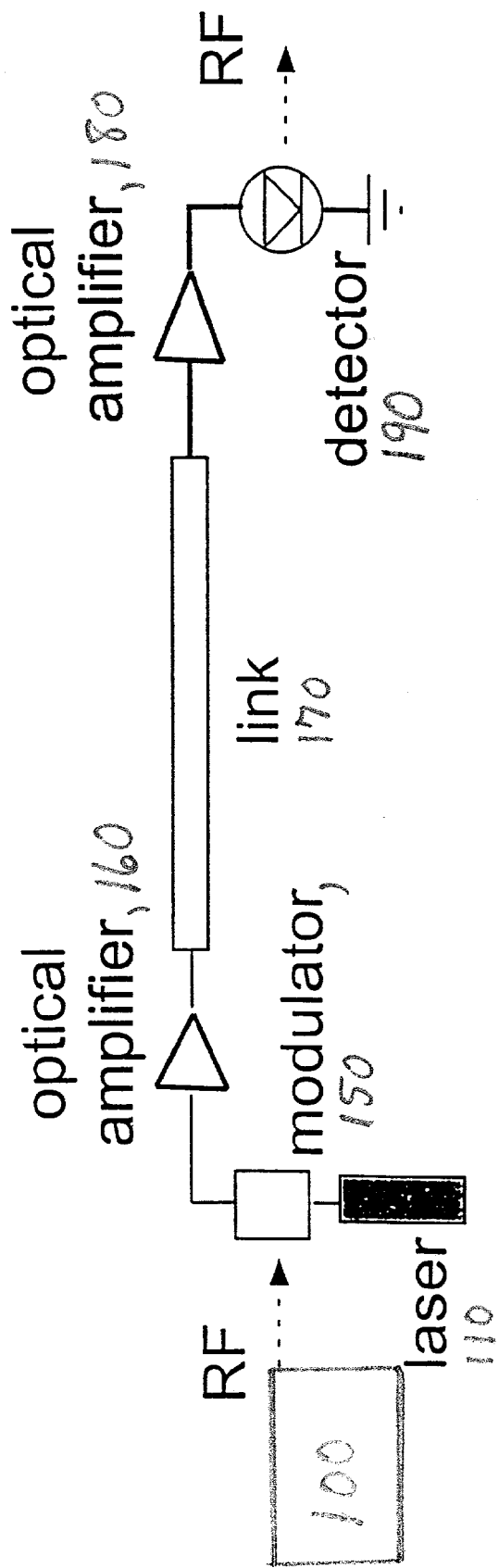
FIG. 2 is a block diagram of the present invention.

A block diagram of the present invention is shown in FIG. 2 which uses an RF carrier generator 100, laser 110, modulator 150 and detector 190. Applied to the electro-refractive modulator, the RF voltage modulates the CW laser light. The modulator may be the Brown or Sullivan modulator from their patents as modified as described below. That light is amplified before sent across the link. This link can be either a fiber with splitters and filters or a large free space span. These links introduce sizeable losses so the signal is amplified before reaching the detector, which then converts the optical signal to RF. The signal to noise ratio (SNR) is a measure of a link's quality. The SNR of the RF link can be characterized by $$SNR_{out} = \frac{P_{signal}^2}{P_{signal}^2 / SNR_{in} + RIN \cdot P_{avg}^2 + 2N_{ASE} P_{avg}}.$$

Specifically, RIN is the relative intensity noise and $N_{ASE} = h\upsilon n_{sp}$ is the amplified spontaneous emission power. For nearly saturated amplifers, the spontaneous emission rate $n_{sp}$ is approximately 1. $P_{avg} = P_{OUT} C_0$ is the average optical power after the modulator. This total includes the information carrying power $P_{signal} = P_{out}^{(1)}$. The average received power needed by the preamp is given by $$P_{r,avg} = \frac{N_{ASE}(P_{avg}/P_{in})^2}{(P_{out}^{(1)}/P_{in})^2 \left[\frac{1}{SNR_{out}} - \frac{1}{SNR_{in}}\right] - RIN \cdot (P_{avg}/P_{in})^2}.$$

If the link carries one gigahertz of informaoint and we wish to have 30 dB from the signal to the noise the signal to noise ration and dynamic range are SNR=120 dB·Hz and DR=90 dB·Hz$^{2/3}$. If we allow a one dB degradation between input and output SNR's, the noise figure is NF=1 dB. The Nortel modulator is designee for a workse case extingiotn ratios of 13 dB, which c9orresponds to an asymmetry factor of $\gamma = 0.9045$. FIG. 3 plots the $P_{r,avg}$ versus the DC bias $V_{DC}$.

The solid line has a RIN of −155 dB/Hz and the dotted line has no RIN. RIN adds noise so requires more received power. The link cannot be closed for large received powers because RIN increases with the square of the power. In addition, the beating of the signal and ASE noise increases linearly with the average power. Consequently, low biasing helps reduce the noise. However low biasing increases the insertion loss of the modulator, necessitating a larger post-amplifier. The downward spikes in received power occur when the IMD3 term is negligibly small. There the received powers are $P_{r,avg}$=16.466, 1.263, 34.628, and 0.592 $\mu$W at $V_{DC}/V_\pi$=0.6436, 1.1295, 1.4802, and 1.7725 respectively. A DC bias error of 0.01% is assumed. When $V_{DC}$=1.1295 $V_\pi$ and 1.7725 $V_\pi$, the modulator is low biased, so the power requirements for receiver are less. FIG. 3 plots how fractional errors in the DC bias voltage may affect the received power.

In conclusion, we present a novel way to suppress the third order harmonic distortion of an electro-refractive modulator. In an analog link with SNR=120 dB·Hz and DR=90 dB·Hz$^{2/3}$, this linearized modulator has modulation depth of 86%. As a result, the receiver is power efficient requiring only microwatts of power.

When optical modes change their character, the modes may transfer varying amount of power to each other. An example of such a device is a directional coupler. The transfer function of a 2×2 direction coupler with uniform gap between modes and with quadratic electro-optic effect is.

$$P_{out}/P_{in} = \frac{\sin^2 \left| \kappa L \sqrt{1+3V^4} \right|}{1+3V^4}$$

Note that the voltages are normalized (or divided by $V_\pi$). If this had linear EO, the voltages would be raised to a power of 2 instead of 4. The function for a 1×2 directional coupler or Y fed coupler is a bit different but gives similar results. In addition, people can create weighted coupling directional couplers by varying the gap between waveguides. These couplers should also have places where the third derivative is zero, and consequently where the modulator is linear.

The Taylor coefficients for the 2×2 directional coupler are given in the attached sheet. To eliminate IMD3, it is good to operate where the 3$^{rd}$ derivative is substantially zero. If one is more concerned about having a low IMD2, one should zero out the 2$^{nd}$ derivative.

Fabry Perot cavities, integrated optical rings are two examples of devices whose transmission peaks at certain frequencies. Or certain indices of refraction. If we were to change that index, we can shift the transmission peak, and create a modulator. For example, the Fabry Perot has a transmission profile of T=$(1-R)^2./((1-R)^2+4R \sin (\delta/2)^2)$ where $\delta$ is the optical path length between the two cavity mirrors (or gratings or other reflective apparatus). The path length depends linearly on the index of refraction, which in this case is quadratic with voltage. Attached is a maple script, which shows that there are bias points where the DC voltages give rise to null 3$^{rd}$ derivative (or no IMD3). And there are bias points to suppress the 2$^{nd}$ derivative (or IMD2).

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An amplitude modulated optical communications system comprising:
    a means for generating an RF voltage modulating signal which has a varying voltage amplitude;
    a laser which outputs an optical carrier wave signal; and
    an electro-refractive modulating means that modulates the optical carrier wave with the RF voltage modulating signal to output thereby a modulated optical signal with an intensity pattern that is quadratically electro-optically modulated, wherein said modulating means comprises a programmable electro-refractive modulator that has been programmed to implement a phase dependant addition of modes between the RF voltage modulating signal and the optical carrier wave signal where a phase of the modulated signal is electro-optically modulated with a phase that has a quadratic dependency on the varying voltage amplitude of the RF voltage modulating signal.

2. An amplitude modulated optical communications system, as defined in claim 1, further comprising:
    a first optical amplifier that produces a first amplified optical signal by amplifying the modulated optical signal of the electro-refractive modulating means;
    a fiber optic communications link that conducts the first amplified optical signal;
    a second optical amplifier that outputs a second amplified optical signal by processing signals conducted by the fiber optics communication link; and
    a demodulator that outputs an information signal by processing the second amplifier optical signal from the second optical amplifier.

3. An amplitude modulated optical communications system, as defined in claim 2, wherein said programmable electro-refractive modulator is programmed to optically modulate the optical carrier wave of the laser with a power transfer between modes that depend on index of refraction and where index is dominated by quadratic dependency on voltage and where a DC bias in voltage nulls out harmonic distortion.

* * * * *